Jan. 5, 1960     M. U. MORRIS     2,919,653

OIL PUMP

Filed May 15, 1959

INVENTOR
MERCHANT U. MORRIS
BY Herbert A. Minturn
ATTORNEY

United States Patent Office 2,919,653
Patented Jan. 5, 1960

2,919,653
OIL PUMP
Merchant Urbanna Morris, Indianapolis, Ind.
Application May 15, 1959, Serial No. 813,475
4 Claims. (Cl. 103—175)

This invention relates to a piston type pump wherein the piston is reciprocated within a cylinder in the absence of a crankshaft and connecting rod. The driving force for reciprocating the piston consists essentially of a screwshaft with which are meshed constantly a pair of worm wheels, these wheels being rotatably mounted in the piston and having connecting arms pivoted to the wheels and to a head of the cylinder.

A primary purpose of the invention is to provide a structure of the above indicated nature which will eliminate the necessity of having to use a crankshaft for a reciprocating system in order to reduce noise and permit the acquirement of quite high pressures delivered by the pump. Also the driving source of power will not be alternately operating under extremely high pressures and then have a low pressure interval in between which causes a fluctuation in load on the power source. This device provides a substantially uniform driving power.

Figure 1:
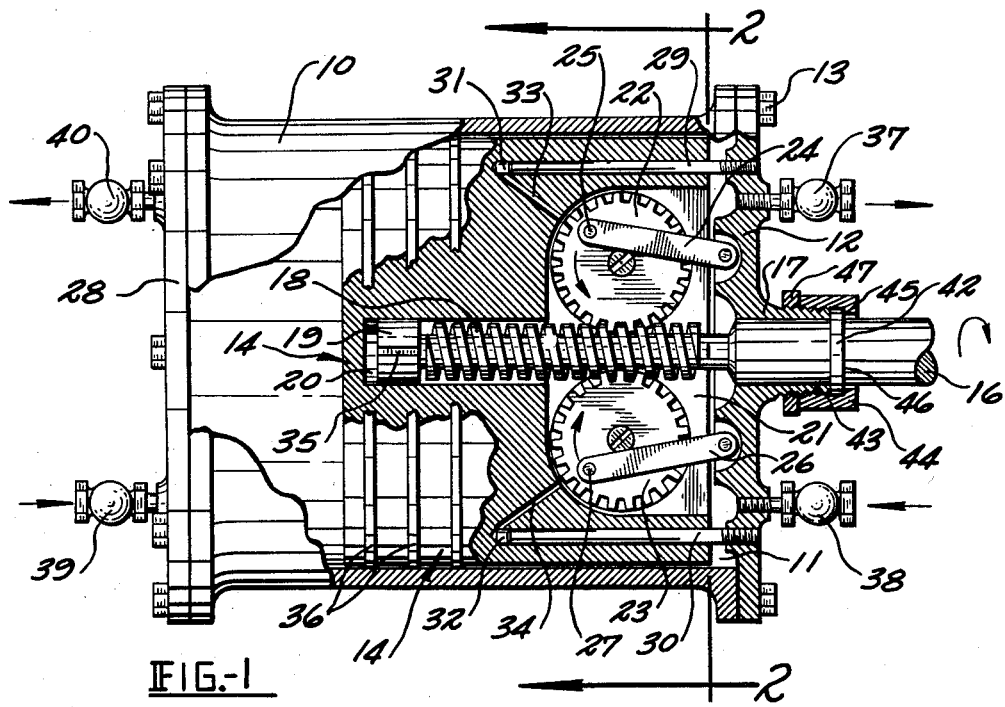
Figure 2:
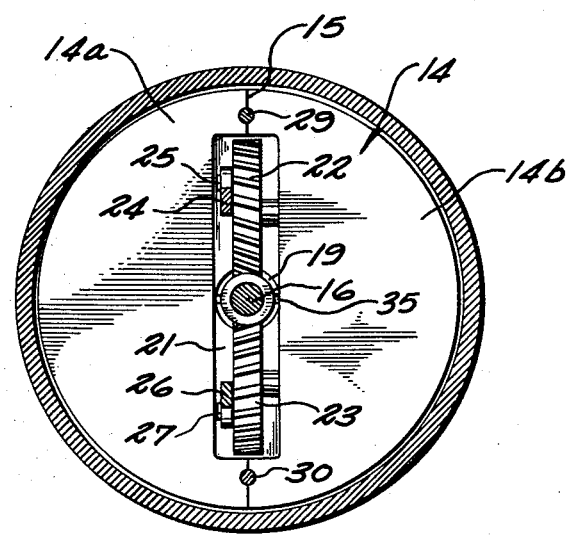

These and many objects and advantages of the invention will become apparent in the following description of one particular form of the invention as illustrated in the accompanying drawing, in which Fig. 1 is a view in side elevation and partial section of a device embodying the invention; and Fig. 2 is a view in transverse section on the line 2—2 in Fig. 1.

A cylinder 10 is provided with at least one open end 11 to which is fitted a removable cylinder head 12. The head 12 may be secured to the end of the cylinder 10 by any suitable means, herein shown in its simplest form by means of cap screws 13. Reciprocally mounted within the cylinder 10 is a piston generally designated by the numeral 14. The piston 14 is divided into two symmetrical halves 14a and 14b, the plane of division being indicated by the line 15 in Fig. 2 so that the two halves 14a and 14b meet and are drawn together on this plane 15.

A shaft 16 rotatably enters through a bearing 17 in the head 12, and has a screw-threaded length 18 entering the piston 14 terminating with a bearing end 19 rotatably fitting within a bore 20 provided in the piston. The screw-threaded portion 18 extends substantially throughout the major axial length of the piston 14.

A cavity 21 is provided in the end of the piston 14 directed toward the head 12. As herein indicated, in the particular form being shown, this cavity 21 is generally rectangular in shape, and is carried equally in respect to its transverse dimensions in the two halves 14a and 14b. The screw-threaded end portion 18 traverses the cavity 21 to enter the bore 20.

One each side of the shaft, screw-threaded portion 18, is rotatably mounted a pinion gear 22 and 23 respectively to be in constant mesh with the threaded portion 18, Fig. 1.

A connecting link or arm 24 is rockably mounted on the inner side of the head 12 to extend in lapping relation over the gear 22 to be interconnected therewith through a pivot pin 25. Also an arm 26 is pivotally connected by one end to the inner side of the head 12 and extends into the cavity 21 in lapping arrangement over the wheel 23 to be interconnected therewith through a pivot pin 27. These pivot pins 25 and 27 must be so located around the wheels 22 and 23 respectively that when the center lines of the arms 24 and 26 come into parallelism one with the other, the axes of the pins 25 and 27 will be on a line perpendicular to those center lines.

To prevent the piston 14 from revolving around the screwshaft 16, a pair of restraining guides 29 and 30 are provided. These guides 29 and 30 are fixed to the cylinder head 12, and extend inwardly of the cylinder 10 to slidingly engage within bores 31 and 32 provided in the piston. Since the piston 14 reciprocates along these guides 29 and 30, a pressure relief passageway 33 and 34 respectively is provided from the ends of the bores 31 and 32 to lead back into the cavity 21 which of course is open from the end of the piston 14 directed toward the head 12. Likewise, to prevent undue pressure being built up between the bearing 19 and the closed end of the bore 20, the bearing 19 is provided with a groove 35 thereacross so that pressure on the one side of the bearing 19 may be equalized with the pressure on the other side. The piston 14 is provided with the usual packing rings 36 herein shown as three in number so as to retard leakage from one end of the cylinder to the other along the side of the piston.

Each end of the cylinder 10 is provided with inlet and outlet passageways, preferably valved adjacent the cylinder. In the present showing, the head 12 carries a discharge valve 37 which is a simple check valve opening under pressure as the piston 14 travels toward the head 12. There is an intake valve 38 also carried by the head 12 which may be a simple check valve which opens upon travel of the piston 14 away from the head 12 but closes in reverse travel of the piston. Likewise, at the other end of the cylinder, such as on an enclosing head 28, there are mounted intake and outlet valves 39 and 40 respectively, each being preferably a simple check valve. That is, the check valve 40 opens upon travel of the piston 14 toward the head 28 while the check valve 39 closes under that travel. The reverse action of the valves is had upon travel of the piston 14 toward the head 12.

The operation of the structure defined is as follows. The shaft 16 is rotated by any suitable source of power applied to its end removed outwardly from the cylinder head 12. The shaft 16 must be held against axial travel in either direction. There are many ways of course of doing this, one particular way being shown as consisting of a collar 42 fixed on the shaft 16 and abutting the end of the boss 43 which extends outwardly from the head 12 and surrounds the shaft 16 for a distance. A nut 44 has an inwardly turned annular flange 45 surrounding the shaft 16 loosely but bearing against the ring 42 from its outer face 46. The nut 44 screw-threadedly engages around the outside of the boss 43, and is held in position by means of a lock nut 47 screw-threadedly carried on the boss 43 and abutting the end of the nut 44. That is, the shaft 16 remains stationary in respect to the cylinder 10 as to its axial position.

As the shaft 16 rotates, both gears 22 and 23 will be revolved one in opposite direction to the other, since they are in constant mesh with the screw-threaded portion 18. As these gears 22 and 23 revolve, the arms 24 and 26 will cause the piston 14 to be reciprocated within the cylinder 10. In the position of these arms 24 and 26 as viewed in Fig. 1, the gears 22 and 23 have turned to bring the piston 14 to its practical limit in its approach to the head 12. Then as the gears 22 and 23 continue to be turned, by the shaft 16 which is always turning in a constant direction, the arms will push the piston 14 away from the cylinder head 12 toward the head 28. This is accomplished as indicated by a constant direction of turning of the shaft 16 thereby requiring no reverse crossing of threads on the shaft by reason of the presence of the two gears 22 and 23 and the arms 24 and 26.

While I have described the invention in the one particular form in minute detail, it is obvious that structural changes may be made without departing from the spirit of the invention, and I therefore do not desire to be limited to that precise form beyond the limitations which may be imposed by the following claims.

I claim:

1. A pump comprising a cylinder closed by a head at each end; a piston reciprocable in the cylinder; a screw-shaft rotatably entering from outside through one of said heads and rotatably, axially entering said piston; a gear rotatably carried by said piston and in constant mesh with said shaft; a second gear rotatably carried by said piston in constant mesh with said shaft on a side opposite from that meshed by said first gear; an arm rockably carried by one end portion by said one head and rockably engaging by the opposite end portion a side of said first gear; and a second arm rockably carried by one end portion by said one head and rockably engaging by its opposite end portion a side of the said second gear; the meshing of said gears with said shaft and the positions of said engagement of said arms with the gears being that wherein, when the gears are rotated by turning of said shaft and the arms are in parallelism, one with the other, said engagement will be on a common line perpendicular to the center lines of both arms.

2. The structure of claim 1 in which there is means carried by said cylinder maintaining said shaft in fixed axial position.

3. The structure of claim 1 in which said piston has a cavity within which said gears are located and said piston has a bore leading from said cavity, within which bore said shaft enters.

4. The structure of claim 1 in which a member is carried by one of said heads and said piston has a bore slidingly receiving said member restraining said piston against rotation about said shaft.

No references cited.